Nov. 18, 1952  F. S. SWICKARD  2,618,514
RAILWAY BRAKE CONTROL MECHANISM
Filed April 10, 1945  3 Sheets-Sheet 1

Inventor
Frank S. Swickard
By Walter W. Burns
Attorney

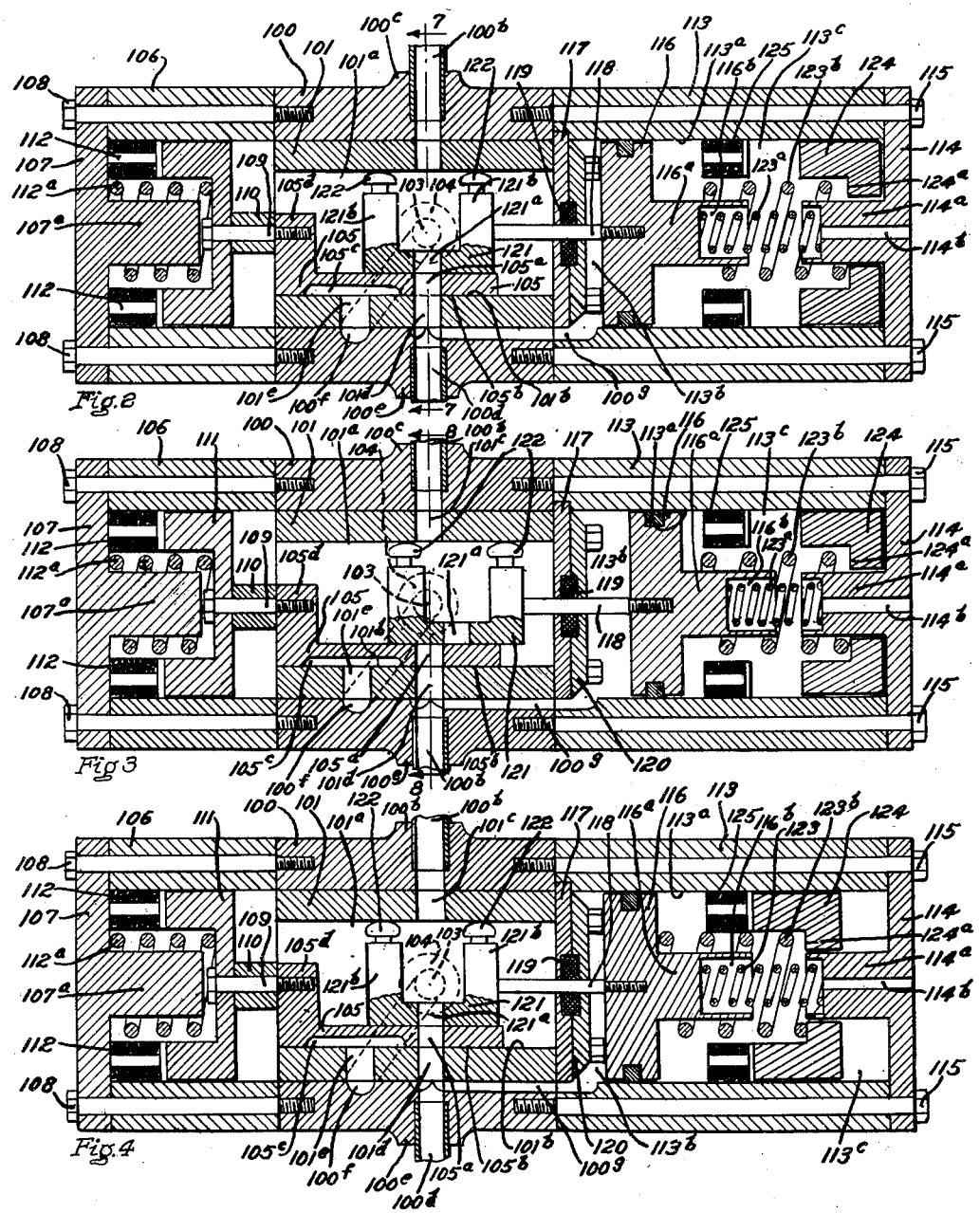

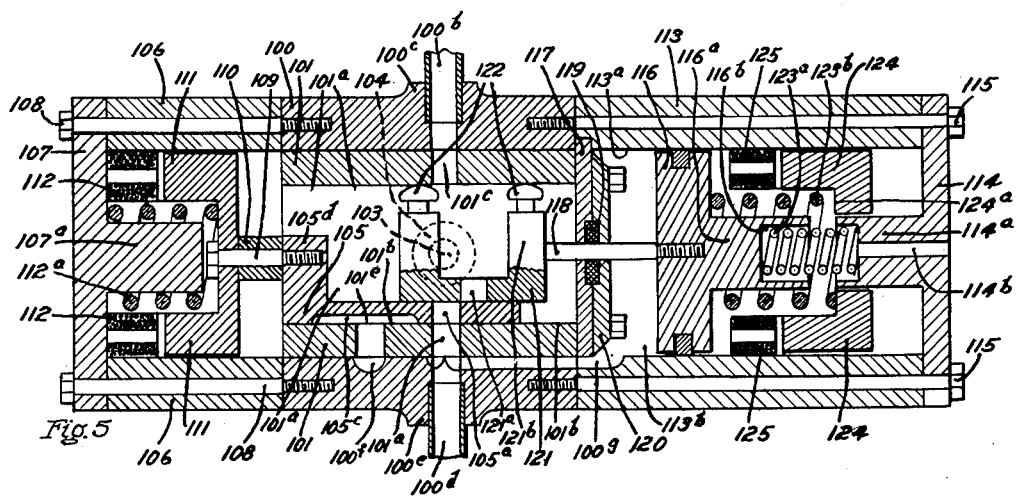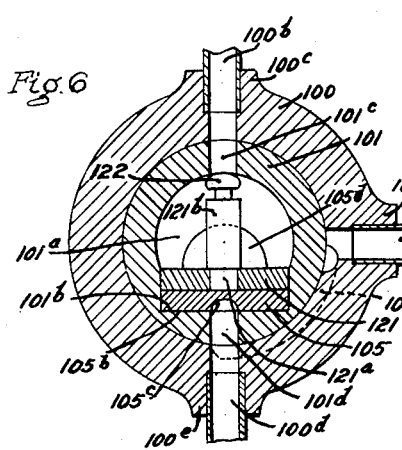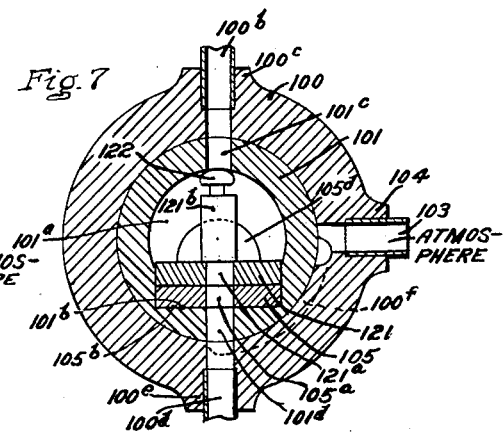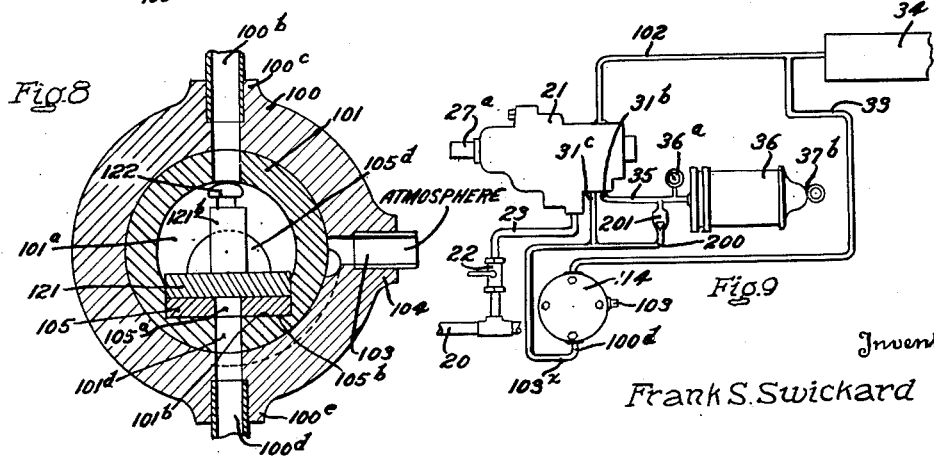

Patented Nov. 18, 1952

2,618,514

UNITED STATES PATENT OFFICE 2,618,514

RAILWAY BRAKE CONTROL MECHANISM

Frank S. Swickard, Denver, Colo.; Laura Janette Swickard, administratrix of said Frank S. Swickard, deceased Application April 10, 1945, Serial No. 587,533

22 Claims. (Cl. 303—15)

This invention relates to air brakes for multiple unit trains such as railway trains.

In operating automatic air brakes on trains with the usual construction and particularly when a train is very long, as a freight train, considerable time is lost in applying the brakes to the rear cars after the brake valve is placed in service position on the locomotive. This time loss is due to the fact that the triple valve of each car, which controls the brake operation on its car, is dependent for its operation on the drop in pressure in the brake pipe, brought about by a registration of the brake pipe with the atmosphere through the brake valve in service position. As the friction of the air on the inside of the brake pipe retards the flow of air therethrough, it is obvious that the opening of a port from the brake valve to the atmosphere, on the locomotive will cause successive operation of the several triple valves in order from front to rear as the friction of the air is retarded, on its way to the exhaust through the brake valve. And since, due to friction, it takes some time to bring about a sufficient pressure drop in the train line to thereby bring about a successive operation of the brake mechanisms from front to rear, it follows that with the usual constructions, the brake applications are not simultaneous.

In addition to the loss of time, there is a loss of pressure in the brake line which drop in the usual construction is necessary to operate the triple valve to open the connection from the reservoir to the brake cylinder. This loss of pressure has to be regained as well as the pressure loss due to the actual brake operation.

The primary object of this invention is the provision of an improvement in air brakes for vehicle trains as railroad trains.

Another object of the invention is the provision of an improved brake mechanism wherein the pressure within the train line or brake pipe is maintained while the application of the brakes is made.

Another object of the invention is the provision of an improved brake mechanism wherein all brake applications and releases may be performed independently of the brake valve.

Another object of the invention is the provision of an improved brake mechanism wherein all of the brake applications throughout the train may be made simultaneously.

Still another object of the invention is the provision of an improved brake mechanism wherein all of the brake applications and releases are performed throughout the train and are made simultaneously.

A still further object of the invention is the provision of an improved brake mechanism wherein, regardless of the piston travel, the pressures on the several brake pistons will be maintained substantially the same throughout, during variable pressure changes.

A further object of the invention is the provision of an improved brake mechanism wherein the brake cylinder pressure in the several brake cylinders of the train units is the same and may be indicated in the engine cab or at any other place on any unit or on all units of the train.

A still further object of the invention is the provision of an improved brake mechanism wherein the brake piston pressure in the several brake cylinders of the train units may be variably controlled from the engine cab or from any one or more units of the train while still maintaining equal brake piston pressure throughout the units of the train.

A still further object of the invention is the provision of an improved brake mechanism wherein the brake cylinder pressure can be increased from a rear point on the train, as for example from the caboose, and be made simultaneously in all parts of the train.

A still further object of the invention is the provision of an improved brake mechanism wherein the brake piston pressures of the several brake cylinders are made to change simultaneously and together throughout the train.

Another and still further object of the invention is the provision of an improved brake mechanism wherein the brake piston pressures of the several cylinders may be controlled without first lowering the pressure in the brake pipe.

Still another and further object of the invention is the provision of an improved brake mechanism wherein the pressures from the reservoirs may be used for the brake cylinders without first lowering the pressure of the brake pipe.

Still another and further object of the invention is the provision of an improved brake mechanism wherein the brake piston pressures are applied from the reservoirs simultaneously and are maintained substantially equal during changes.

Still another and further object of the invention is the provision of an improved brake mechanism wherein the brake cylinder pressures may be applied and released independently of any changes in the brake pipe pressure.

Still another and further object of the invention is the provision of an improved brake mechanism wherein when, for any reason the brake pipe becomes broken, my improved structure can be set for brake action and in which case, the brake piston pressures may be maintained and the brakes maintained in set position while the reservoirs are recharged to standard pressure.

Other and further objects will be apparent to those skilled in the art from a reading of the complete specification.

Referring to the drawing wherein I have illustrated an embodiment of the invention:

Fig. 2 is a cross section of the invention showing working parts in primary service position with the parts slightly enlarged for clearness.

Fig. 3 is a view similar to Fig. 2 but with parts in position after the predetermined pressure in the brake cylinder has been attained, with the graduating valve closed.

Fig. 4 is a view similar to Fig. 3 with the parts in positions immediately after applying higher pressure to the brake cylinder.

Fig. 5 is a view similar to Fig. 4 showing the parts in position after the increased predetermined cylinder pressure has been reached and with the graduating valve closed.

Fig. 6 is a cross section on the line 6—6 of Fig. 1.

Fig. 7 is a cross section on the line 7—7 of Fig. 2.

Fig. 8 is a cross section on the line 8—8 of Fig. 3.

Fig. 9 is a fragmental diagrammatic showing of a slightly different connection of the invention to the conventional mechanism shown in Fig. 1.

Similar reference characters refer to the same or similar parts throughout the specification and drawing.

Figure 1:
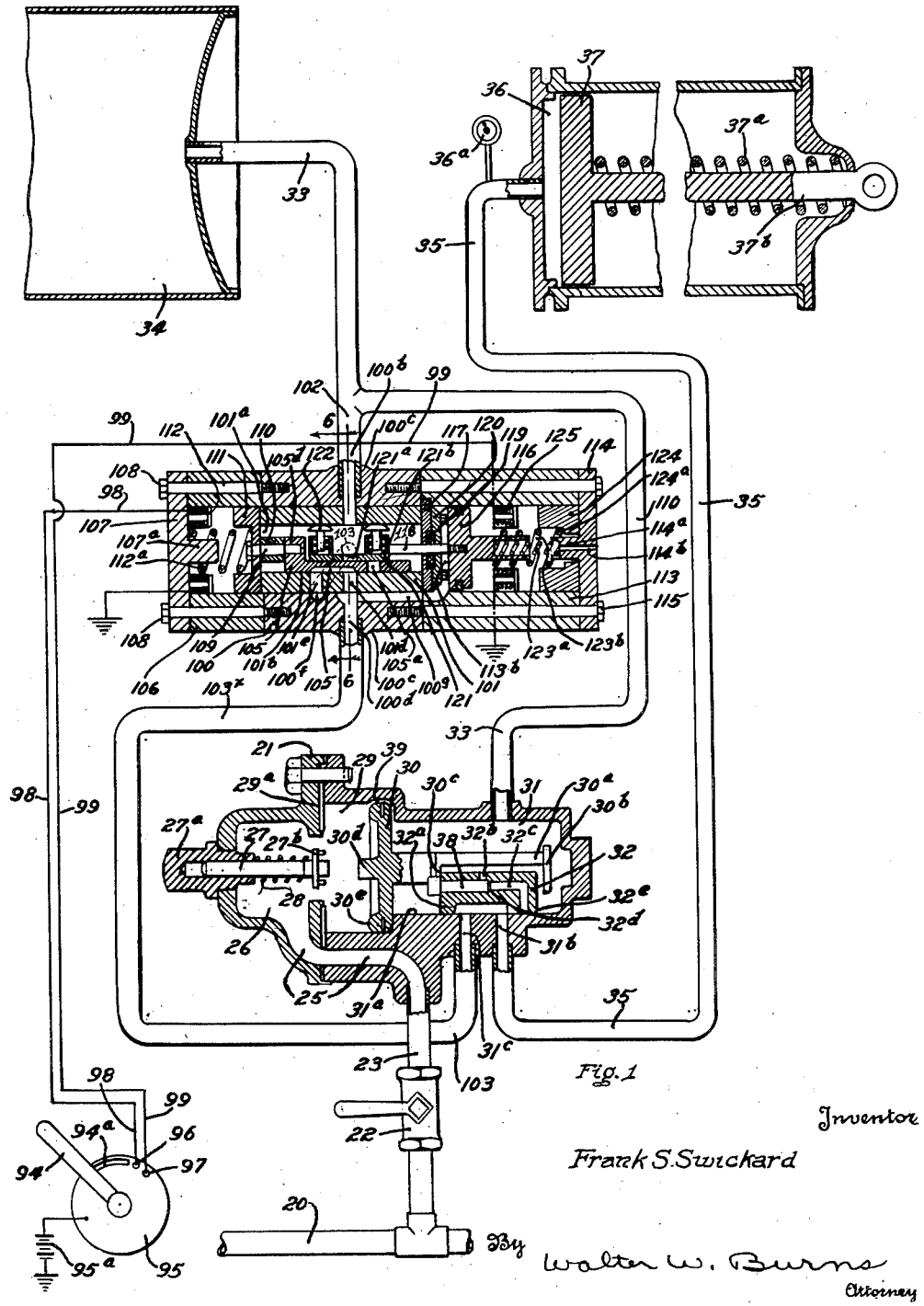
Fig. 1 is a cross section of the triple valve of a railway car brake mechanism showing the invention attached thereto in running position.

In the drawing, 20 designates the brake pipe which extends from the locomotive or other front unit of the train to the rear unit thereof.

In the usual construction of brake mechanism, a brake valve which controls the application of the brakes, opens the brake pipe to atmosphere either slowly to produce a service or light application of the brakes, or suddenly to reduce the air pressure in the brake pipe, thus bringing about an emergency application of the brakes. The brake valve also controls the admission of air from the power operated air compressor on the locomotive through the brake valve and its connections, through the brake pipe to replenish the air pressure in the brake pipe and the reservoir for purposes to be presently described. Various other auxiliary apparatus is supplied to assist in the operation of the compressor and brake valve such as the equalizing reservoir, the feed valve and the pump governor, all of which are well known to those skilled in the art. For this reason, they will not be further described or illustrated.

In order to control the air pressure on each of the several units of the train, there is provided a triple valve the housing of which I have designated generally by the reference character 21. This housing 21 is connected to the brake pipe 20 by means of a pipe 23 with a cut-off 22.

The pipe 23 is connected to a passage 25 in the triple valve housing 21 which connects to a chamber 26. Within a plug 27ᵃ, screwed in the end of the housing 21, is an opening in which slides a spindle 27 which carries the resistor spring 28. The head 27ᵇ is adjacent the chamber 29 which is provided with a leather gasket 29ᵃ.

The interior of the chamber 29 is cylindrical and provides an operating surface for the triple valve piston 30. The triple valve piston 30 is provided with a stem 30ᵃ which extends into the slide valve chamber 31. On one side of the slide valve chamber 31 as at the bottom, as shown, is a slide valve seat 31ᵃ upon which is seated the slide valve 32. This slide valve 32 is provided in its bottom with a groove or chamber 32ᵃ.

Extending from the chamber 31 is a pipe 33 which connects to the auxiliary reservoir 34, which latter serves as a supply for the air pressure.

Connected through the valve seat 31ᵃ is a passage 31ᵇ, which is connected to a pipe 35 leading to the brake cylinder 36 in which operates the brake piston 37. Extending also from the valve seat 31ᵃ, is a passage 31ᶜ which in the normal construction is open to the atmosphere but in the present case with this invention attached, is connected to the passage 100ᵈ, to be later described.

The triple valve slide valve 32 has its groove or chamber 32ᵃ in place over the passages 31ᵇ and 31ᶜ, so arranged that in one position, the slide valve chamber 32ᵃ will bridge and connect the openings 31ᵇ and 31ᶜ and in another position, will prevent the passage of air between these two passages.

The stem 30ᵃ of the triple valve piston, is provided with an overhanging portion 30ᵇ, termed the piston stem end. Secured to the piston stem to move longitudinally therewith, is a graduating valve 38 which has a cylindrical portion which moves in a correspondingly shaped cylinder within the slide valve 32.

An opening 32ᵇ in the slide valve 32 is connected with a passage 32ᶜ which terminates in a position to register with the passage 31ᵇ when the projection 30ᵈ moves to a position adjacent to the head 27ᵃ in a position where further movement would compress the spring 28. At a point in the passage 32c near the opening 32b is the valve seat 32d upon which the conical end of the graduating valve 38, in one position, rests to close the connection between the opening 32b and the passage 32c.

On the stem 30a is a shoulder 30c which with the stem end, 30b, permits a limited relative movement between the stem 30a and the slide valve 30.

It will be noted that when the piston 30 is in position, so that the chamber 29 has its greatest capacity, there is a small passage 39 around the piston 30 to connect the chambers 29 and 31 to permit the passage of air under pressure from the brake pipe 20 to pass by way of the pipe 23, the passage 25, the chamber 26, the chamber 29, the small passage 39, the chamber 31 through the pipe 33 to the auxiliary reservoir 34.

With the piston 30 in the position just described, the air pressure from the brake line 20 will soon fill the auxiliary reservoir 34 to the same pressure as the brake pipe. As the brake cylinder 36 is connected through the pipe 35 the passage 31b, the groove or chamber 32a and the passage 31c through the passage 100d to atmosphere, as will be later described, the spring 37a will force the rod 37b to be retracted to move the brakes to running position. A gage 36a is provided with connection to the brake cylinder and may be applied to the locomotive and any and all brake cylinders.

It being understood that in the usual brake construction, the passage 31c is always open to atmosphere and with this in mind, the parts heretofore described in detail are old and well known in the art.

However, in order to fully understand this invention, the service application and emergency applications of the above well-known brake mechanisms will be described.

With the parts in the running positions as just described, air is slowly permitted to escape from the brake pipe. This permits a pressure reduction in the chamber 29 by way of the pipe 23, the passage 25 and the chamber 26, to the chamber 29. With the higher pressure in the chamber 31 and the reduced pressure, in the chamber 29, the piston 30 moves away from the chamber 31. The first part of this movement causes the piston 30 to cover the small passage 39. The first part of this movement of the piston 31 withdraws the graduating valve 38 from its seat 32d and permits the air pressure from the auxiliary reservoir 34 and the chamber 31 to enter the opening 32b and pass to the passage 32c. It will be noted at this point in the operation that due to the slight relative movement, already described, which is possible between the stem end 32b and the slide valve 32, the first part of the movement of the piston 30 will move the graduating valve 38 and the stem 30a but the slide valve 32 will not move until the stem end 30b engages the slide valve 32.

As the piston 30 moves farther from the chamber 31, the slide valve moves in the same direction with the piston. The first result of this further movement permits the chamber 32a to be moved so that it no longer connects the passages 31b and 31c, the passage 31b, being blanked. But since the passage 31c is, in the usual construction, connected to atmosphere, it follows that the atmospheric connection is broken to the brake cylinder 36.

The piston 30 continues its movement, moving the slide valve 32 with it, until the passage 32c is opened to the passage 31b. But since, as already stated, the pressure of the auxiliary reservoir is in the passage 32c, this opening of the latter immediately permits the pressure from the reservoir 34 to enter the brake cylinder 36 and press the rod 37b against its spring 37a to apply the brakes. It is to be here noted that, in the usual construction, due to the variation in brake piston travel according to the setting of the brakes, and the time of operation of the triple valve in applying the brakes, there will be a variation in the brake cylinder pressure and consequently a variation in the actual brake pressure at the wheels. And since with the present invention, the details of which will be later described, the pressure is predetermined and regulated from the brake cylinder itself, the brake cylinder pressure with this invention is at any one time, the same throughout the train.

When the brakes, with the usual construction, have given the proper braking action, the brake valve is closed. This action stops the passage of air from the brake pipe to the atmosphere and consequently stops the movement of the piston 30, with the pressure equal on both of its sides. But since the pressure within the chambers 31 will continue to decrease due to the continued passage of air from the auxiliary reservoir 34 and the chamber 31 to the brake cylinder 36, there will be a reduction in pressure in the chamber 31, which will cause a slight movement of the piston 30 back toward the cylinder 31. While this movement is not great, it is sufficient to move the graduating valve 32 to its conical seat 32d, thereby shutting off the air connection from the opening 32b to the passage 32c. This position of the graduating valve 38 is called the lap position and the pressure in the brake cylinder is retained.

When, however, the brake pipe is again connected to the normal high pressure, the piston 30 is moved toward the chamber 31. This movement keeps the valve 38 on its seat 32d, maintaining closed the connection between the auxiliary reservoir and the brake cylinder and an instant later moves the slide valve 32 so that the groove or chamber 32a will connect the pressure side of the brake piston 37, in the usual construction, to atmosphere. This permits the retracting spring 37a to withdraw the brake rod 37b and its brake.

But as the piston 30 moves to its limit of position toward the chamber 31, which is the charging position, the small passage 39 is opened and the pressure in the auxiliary reservoir is restored to its normal pressure of the brake pipe.

If it is desired to give the train a sudden stop, it is only necessary to set the brake valve to permit the air in the brake pipe to be suddenly released to atmosphere. This causes the air pressure within the chamber 29 to be quickly reduced below that of the chamber 31 and the reservoir 34. The piston 30 at once moves until the projection 30d engages the head 27b and compresses the spring 28 until the bead 30e is sealed against the gasket 29a. This action moves the slide valve 32 with the piston stem and places the slide valve 32 so that its end 32e is to the left beyond the opening of the passage 31b, thus admitting the full pressure of the chamber 31 directly to the piston chamber 36. This operates the brake piston at the equalized pressure between the reservoir and the brake cylinder. This same action takes place when an accidental break in the brake pipe occurs.

The operation of returning to running position has already been described.

The construction of my improved brake control mechanism will now be described.

A main body 100 is illustrated as cylindrical in form and is provided with a bushing 101 having a chamber 101a which has, as illustrated, on its bottom, a stationary valve seat 101b in the bottom of the chamber 101a. This valve seat 101b is preferably in a plane.

The body member 100 is provided with an opening 100b which registers with an opening 101c in the bushing 101 to provide a connection from the chamber 100a through a boss 100c which latter is connected to the car auxiliary reservoir 34 already described, by a pipe 102.

The body member 100 and the stationary valve seat bushing 101 are provided with respective registering openings 100d and 101d. The opening 100d passes through a boss 100e which is connected to the car brake cylinder through the triple valve exhaust by the tube 103. The valve seat bushing 101 is provided with an opening 101e which connects at its outer end to a passage 100f in the body member 100. This passage 100f extends around the outside of the bushing 101 as a groove in the body 100 to an opening 103 through a boss 104 where it is connected to atmosphere to permit the exhausting of the brake cylinder to the atmosphere. It is to be observed that when my invention is connected to any of the usual constructions, the connection of the brake cylinder 36 to the atmosphere can be made only when the valve 105, to be presently described, permits such connection.

On the valve seat 101b is a slide valve 105 which is provided with an opening 105a. This opening 105a, in one position registers with the opening 101d already described. The slide valve 105 is provided with a surface 105b which registers with the surface 101b.

To one side of the opening 105a is a slot 105c which is of sufficient length and in position to span and connect the openings 101d and 101e in the valve seat bushing 101, when the valve 105 is moved in one direction.

Suitably secured to the end of the body member 100 is the magnet housing 106, in the form of a cylinder, one end of which is against the end of the body member 100, the other end being closed by the end member 107. The end member 107 and the housing 106 are held in place by a set of stud bolts 108 which are threaded into the body member 100.

The slide valve 105 is provided with an end lug 105d into which is screwed a stud bolt 109. A spacer collar 110 holds the magnet armature 111 spaced from the lug 105d, the collar 110 and the armature 111 being held in place by the stud 109.

On the inner side of the end member 107 is a projecting spring guide 107a to hold in place the compression spring 112a, which is held between the end member 107 and movable magnet armature 111.

A suitable electro-magnet 112 is provided in position to attract its armature 111 and move the parts 111, 110, 109 and the valve 105 when the electro-magnet 112 is energized. When energized the magnet 112 moves its armature 111 and the valve 105 to such a position that the opening 105a registers with the opening 101d of the bushing 101. In released position, the spring 112a forces the valve 105 to a position where the groove or slot 105c registers with and connects the openings 101d and 101e in the bushing 101, thus connecting the interior of the brake cylinder through passage 100d to the opening 100f through the boss 104 to atmosphere, whenever the triple valve is in running position.

Opposite the housing 106 and attached to the main body 100, is a housing 113 secured in place with an end piece 114 by the studs 115 which are threaded into the body 100.

Within the housing 113 is a cylindrical surface 113a in which is slidably mounted a piston 116. This piston 116 with its expansible chamber 113b forms what I term a pressure regulating pneumatic. Between the main body member 100 and the housing 113 is a separating partition 117 which has an opening at its center. Through this central opening passes a piston rod 118 which is secured to a graduating valve 121. This valve 121 is provided with an opening 121a which in one position registers with the opening 105a of the slide valve 105 and in another position is out of such registration.

The graduating valve 121 is provided with bosses 121b which have openings to receive spring pressed plungers 122, the heads of which engage the wall of the chamber 101a, reacting to force the valve 121 against the slide valve 105, and the latter, in turn, against the valve seat 101b.

The piston 116 is provided with a spring guide 116a in which is an opening 116b within which is located a spring 123a whose opposite end engages the boss 114a. A second spring 123b is outside the guide 116a and is of sufficient length to reach from the extended position of the adjacent wall of the piston 116 to the adjacent shoulder 124a of the magnet armature 124. This armature 124 is attracted to and is moved by the electro-magnet 125 when the latter is energized. This armature 124 is free to move longitudinally in the chamber of the housing 113. It will be apparent that when the electro-magnet 125 is energized, the armature 124 will cause the compression of the spring 123b for a purpose to be described. The end piece 114 is provided with a boss 114a which is provided with a vent 114b. This vent maintains the outer space 113c of the housing 113 at atmospheric pressure.

I will now describe the operation of my invention, it being borne in mind that, as illustrated, the three outside operative connections are (1) through the passage 100b to the pressure reservoir 34 of the car, (2) to the atmosphere through the passage 103 and (3) to the brake cylinder 36 through the passage 100d. Although not necessarily so, in the present illustrated form, the passage 100d is connected to the brake cylinder through the exhaust connection of the triple valve of the usual automatic brake mechanism. It is to be here noted that since the exhaust from the triple valve is through my improved structure, to the atmosphere, no release of pressure in the brake cylinder can be brought about unless the atmospheric connection of my improved structure is open to the atmosphere.

Assuming the parts to be in running position, brakes not applied, the electro-magnets 112 and 125 not energized, the slide valve 105, graduating valve 121 and other parts will be in running position as illustrated in Fig. 1. It will be noted that the piston 116, under influence of the spring 123a will hold the valve 121 with its opening 121a in position to function, the opening 121a, being, however, blanked out from functioning by the slide valve 105, as illustrated in Fig. 1. It is now desired to apply a predetermined brake cylinder pressure of 5 pounds per square inch.

In the engine cab, or wherever it is desired to have it located, the switch handle 94 with its arcuate contacting arm 94a, is pivotally mounted on the contact plate 95. This arm 94a is normally out of contact with the contact points 96 and 97 which connect, respectively, with the wires 98 and 99 leading to the respective electro-magnets 112 and 125. On movement of the switch handle 94 so that contact is made to the point 96, the electro-magnet 112 is energized. This draws the armature 111 to the left as illustrated in Fig. 1.

The armature 111 through the operating rod 109, moves the slide valve 105 and blanks the connection between atmosphere and the brake cylinder through the passage 105c and immediately thereafter, opens the connection from the chamber 101a through the opening 105a to the brake cylinder by way of the passage 101d, 100d. This is brought about by the fact that the chamber 101a is always connected directly to the pressure supply through passage 100b. Pressure is thus applied to the brake cylinder.

But as soon as the slide valve 105 opens the pressure to the brake cylinder, it also applies pressure from the passage 100d, through the by-passage 100g to the chamber 113b between the piston 116 and the wall 117—120. The spring 123a presses against the piston 116 at a strength that when opposed by an air pressure of 5 pounds per square inch within the chamber 113b, the piston 116 will move the graduating valve 121 to close communication from the chamber 101a to the brake cylinder. It is believed obvious that the substitution of a spring 123a of greater strength will give a greater predetermined pressure than 5 pounds per square inch within the chamber 113b. The parts are now, as illustrated in Fig. 3, in position to have produced and to maintain a pressure within the brake cylinder of 5 pounds per square inch. This pressure will be maintained in the brake cylinder until released. Any leakage from the brake cylinder is at once overcome by the opening of the graduating valve 121 to again raise the pressure to the predetermined 5 pounds per square inch.

If it is desired to return the parts to running position, it is necessary only to move the switch handle 94 counterclockwise, to disconnect the arm 94a from the contact point 96. This causes the de-energization of the electro-magnet 112. The spring 112a then forces the armature 111 to the right as illustrated with a consequent blanking out of the pressure connection through the opening 121a by movement of the valve 105, further movement of the valve 105, connecting the brake cylinder 36 to atmosphere through the cavity 105d in the slide valve 105.

If, however, instead of releasing the pressure to return the brakes to running position, it is desired to go into a maximum braking position, it is only necessary to move the handle 94 farther to the right so as to apply the electric power from the source of electric current 95a. This connects the handle arm 94a to the contact point 97 leaving the arm still in contact with the contact point 96. This action energizes the wire 99 with the consequent energization of the electro-magnet 125.

It is to be here noted that with my device in maximum braking position it is possible to obtain a greater pressure than with the usual construction in "emergency" position. This is for the reason that during the emergency operation of the invention, no drop in the pressure of the brake line is made. Further, since the brake cylinder pressure through the duct 100g causes a uniform pressure throughout the train, less expenditure of air pressure is made for both the service and emergency applications. As the present invention is operated in maximum braking position, the pressure of the brake cylinder is supplied directly without reduction from the auxiliary reservoir. But the triple valve of the usual pneumatic brake mechanism being, for example, in running position; is connected to the train line brake pipe and also to the auxiliary reservoir. For this reason, when the auxiliary reservoir pressure begins to fall, because of the passage of air therefrom to the brake cylinder, the pressure from the main line brake pipe will, at once pass through the triple valve to the auxiliary valve to build up the pressure therein. This pressure at once builds up the brake cylinder pressure until the pressure is the same in the brake cylinder, the auxiliary reservoir and the brake line.

The energization of the electro-magnet 125 draws the armature 124 to the left as illustrated. The spring 123a is fully compressed, but the magnetization of the armature 124 compresses the second spring 123b. The spring 123b assisted by the expansive force of the spring 123a, moves the piston 116 to the left as shown in Fig. 4. This action opens the connection between the chamber 101a and the brake cylinder passage 100d through the passage 121a in a position somewhat as this valve is shown in Fig. 4. But this greater pressure passes through the passage 100g to the chamber 113b, again moving the piston 116 and the valve 121 to the right to again close the valve opening 121a and shut off the pressure supply from the chamber 101a.

While the pressure in the brake cylinder was mentioned as predetermined to be 5 pounds per square inch with the electro-magnet 112 energized and the electro-magnet 125 not energized, the last operation described with both electro-magnets 112 and 125 energized, causes a compression of both springs 123a and 123b with a resultant increased predetermined pressure in the brake cylinder as for example with springs of known compression strength, a pressure as high as 65 pounds per square inch might be attained with a reservoir pressure of 70 pounds per square inch.

As soon as the brakes begin to take effect and to avoid flat wheels caused by locking of the same, the handle 94 may be returned to running position a sufficient length of time for the pressure in the brake cylinder to become reduced to the desired point. This pressure is made manifest by the pressure control gage 36a in the engine cab.

The handle 94 is then returned to service brake position with the arm 94a in contact with the contact point 96.

The operation of the several parts which takes place when the switch handle 94 is moved to the left, will now be described. As soon as the handle 94 is moved to break the contact with the contact points 96 and 97, the electro-magnets 112 and 125 are de-energized. This deenergization permits the armatures 111 and 124 to be forced, by their springs 112a and 123b away from the respective magnets 112 and 125. The first result of this action is the movement of the slide valve 105 to cause the groove 105c to connect the opening 101d to the passage 100f. But since the passage 101d is connected to the brake cylinder through the passage 100d and the passage 100f is connected to atmosphere, it follows that the brake cylinder will, at once be connected to atmosphere.

At the same time, the reduction in pressure within the brake cylinder also permits the air pressure within the chamber 113b to escape through the passage 100g. The springs 123a and 123b at once expand and the spring 123a forces the piston 116 to be moved to the left as shown.

In the engine cab is the pressure gage 36a in full communication with the brake cylinder of the engine at all times. And since the pressure of the reservoirs of the engine and train are supplied at the same pressure from and by the same source and since the lowering of the pressure in all of the brake cylinders takes place simultaneously, it follows that the gage in the engine cab connected to the brake cylinder will indicate the pressure of the many brake cylinders throughout the train as the changes take place. In this way, the brake pressures will be the same throughout the train, regardless of piston travel.

When it is observed in the cab that the pressure of the brake cylinders has dropped to the desired pressure as for example 50 pounds per square inch, the switch handle 94 is moved to cause the arm 94 to make connection of its arm 94a with the contact point 96.

This service brake connection, as has been described, causes the energization of the electro-magnet 112. This moves the armature 111 and the valve 105 to the left as shown and blanks the connection between the brake cylinder and the atmosphere through the passage 105c of the valve 105. At the same time, this causes registration of the passage 105a and the passage 101d. If now, the pressure in the chamber 113b is reduced to, for example as suggested, 50 pounds per square inch, it follows that the brake cylinder pressure within the chamber 113b will, through the piston 116, hold the graduating valve so that its opening 121a will not register with the passage 101d through the slide valve opening 105a. This condition is due to the fact that the spring 123a is set to open the opening 121a to the slide valve opening 105a, when and only when the pressure in the chamber 113b is less than 5 pounds per square inch.

With the parts in the positions as just described, the pressure of the reservoir 34 within the chamber 101a cannot reach the brake cylinder passage 100d because the brake cylinder pressure holds the opening 121a of the graduating valve 121 off the opening 105a. See Fig. 6. Thus no increase in the brake cylinder pressure can take place. A further reduction in pressure within the brake cylinder may be made by again returning the switch handle 94 to running position and again putting it in service brake position.

If now, an increase in the brake cylinder is desired, the switch handle 94 is moved to place its arm 94a so as to contact the contact point 97. Immediately the magnet 125 is energized, the armature 124 is drawn to it with the resultant compression of the spring 123b. This causes the piston 116 to overcome the pressure within the chamber 113b and the piston 116 moves the graduating valve 121 to open the valve opening 121a to complete the connection from the chamber 101a through the openings 105a, 100d to the brake cylinder. The pressure then rises until it reaches a maximum for the spring 123b or until the switch handle 94 is moved to disconnect its arm 94a from the contact point 97, with resultant de-energization of the electro-magnet 125 and the weakening of the effective push of the spring 123b.

One important operation of my invention is performed in the case of a break in the train line or brake pipe. This may occur in case of a train coupler connection with a consequent separation of a portion of the cars from the remainder. Or it may occur simply by a break some where in the train line or brake pipe. In either case, the emergency brake setting takes place and the train comes to a stop. In the usual course of restarting the train, the train line or brake pipe is again connected and in the case of a separation of a portion of a train from the main portion, it is necessary to raise the pressure in the train line or brake pipe to recharge the reservoirs on the several cars. But in so doing, it is necessary to release the triple valve and this release of the triple valve will, if the train is on a sufficient grade, permit the train to run away. With my construction this may be made impossible.

In considering this operation let us assume the brakes to be still set in emergency position, with the air and other connections restored. Instead of, at once applying high pressure to the train line or brake pipe, the handle 94 is moved to service brake position. This at once moves the armature 111 and the slide valve 105 to the left, blanking the passages 100d and 101d from atmosphere due to the fact that the groove 105c has been moved so that it cuts off the connection between the passages 101d and 101e. This permits holding of the brake cylinder pressure until by the usual construction, the reservoir is recharged.

In Fig. 9 where a slight modification is illustrated, the connection 100d, 103x from the exhaust passage 31c of the usual construction has a by-pass connection 200 to the pipe 35 which leads from the passage 31b to the brake cylinder 36. In the by-pass connection 200 I place a check valve 201 which will permit one-way passage of air from the passage 100d, 103x through the connection 200 to the brake cylinder. The discharge of air from the brake cylinder 36 is as already described. By this construction, air pressure can be applied or additional air pressure can be admitted, regardless of the position of the piston 30.

It is to be understood that the term reservoir is used to refer to any sufficient source of pressure for the operation of the brake piston in the brake cylinder, that this pressure may be from any source as for examples, the main reservoir which may be on the locomotive, an auxiliary reservoir which may be on a car or a reserve reservoir which may be at any convenient place to deliver its pressure; and that the particular type of triple valve and other constructions of the standard railroad equipment which has been illustrated and the particular form of construction for applicant's invention as illustrated are merely illustrative and that the invention may be used in other relations or by itself without departing from the spirit of the invention and within its scope as claimed.

Having described the invention, what I claim is:

1. In a railway brake mechanism having an air reservoir and brake cylinder on a car, a valve controlling a passage from the reservoir to the brake cylinder, electro-magnetically operated means for operating the valve to place the brake cylinder under pressure, a second valve adjacent to and coacting with the first valve to control said passage, pneumatic means for operating the second valve to close the latter at a predetermined pressure in the brake cylinder and an electro-magnetic device for opening the second valve to increase the pressure above the predetermined brake cylinder pressure.

2. In a railway brake mechanism having an air reservoir and brake cylinder on a car, a valve, electro-magnetically operated means for operating the valve to give the brake cylinder a predetermined pressure, a second valve coacting with the first valve, pneumatic means for operating the second valve to close the latter at the predetermined pressure in the brake cylinder and a resilient electro-magnetically operated means for opening the second valve to increase the pressure to a higher pressure, the valves by controlling their electromagnetic means being manually controllable to provide any desired pressure between the first named predetermined pressure and the higher pressure.

3. In a railway brake mechanism having an air reservoir and brake cylinder on a car, a valve having a port, electro-magnetically operated means for operating the valve to a fluid supply position, a second valve coacting with and in movable contact with the first valve and having a port registrable with the first-named port to control passage of air to the brake cylinder, pneumatic means for operating the second valve under influence of the brake cylinder pressure to move the second valve to a closed-port position when the brake cylinder attains a predetermined pressure, and operator-controlled power means including a resilient member, independent of the first valve and in position to move the second valve to, at will, alter the relative positions of the ports and thereby vary the predetermined pressure.

4. In a railway brake mechanism having an air reservoir and brake cylinder on a car, a valve, electro-magnetically operated means for operating the valve to give the brake cylinder a predetermined pressure, a second valve coacting with the first valve to control the passage of air to the brake cylinder, pneumatic means for operating the second valve under influence of the brake cylinder pressure to move the second valve to closed position when the brake cylinder is at a second higher predetermined pressure, and an electro-magnetic device for opening the second valve to increase the pressure in the brake cylinder above the predetermined pressure the first-named valve and its electro-magnetically operated means having connections to variably control, at will, the brake pressure at any point between the predetermined pressures.

5. In a railway brake mechanism having an air reservoir and a brake cylinder on a car, a valve, electro-magnetically operated means for operating the valve, a second valve, means in the first valve for connecting the brake cylinder with the atmosphere, registrable openings in each of the valves for effecting a pressure supply connection to the brake cylinder from the air reservoir when the two openings are in registration, pneumatically operated means connected to the brake cylinder for moving the second valve to disestablish said connection when the air in the brake cylinder attains a predetermined pressure, an operator-controlled electro-magnetic power device including a resilient connection, in a position to exert a force to move the second valve to re-establish said connection, thus increasing said predetermined pressure.

6. In a railway brake mechanism having an air reservoir and brake cylinder on a car, a valve, electro-magnetically operated means for operating the valve, a second valve, means in the first valve for connecting the brake cylinder with atmosphere, registering openings in each of the valves for making a pressure connection to the brake cylinder when the two openings are in registration, pneumatically operated means for moving the second valve to closed position when the air in the brake cylinder is at the predetermined pressure and an electro-magnetic device for counteracting the pneumatically operated means for increasing the pressure of the brake cylinder above the predetermined pressure.

7. In a railway brake mechanism having an air reservoir and brake cylinder on a car, a valve, electro-magnetically operated means for operating the valve, a second valve, means in the first valve for connecting the brake cylinder with atmosphere, registering openings in each of the valves for making a pressure connection to the brake cylinder when the two openings are in registration, pneumatically operated means for moving the second valve to closed position when the air in the brake cylinder is at the predetermined pressure and a resilient electro-magnetically operated means for moving second valve to registration with the first valve to admit air pressure to the brake cylinder above the predetermined pressure.

8. In a railway brake mechanism having an air reservoir and brake cylinder on a car, a valve, electro-magnetically operated means for operating the valve, a second valve, means in the first valve for connecting the brake cylinder with the atmosphere, registrable openings in each of the valves for making a pressure connection to the brake cylinder from the air reservoir when the two openings are in registration, a pneumatically operated piston connected to the brake cylinder for moving the second valve out of registration with the first valve to close the pressure connection from the air reservoir to the brake cylinder when the air in the brake cylinder reaches a predetermined pressure an operator-controlled electro-magnetic power device including a resilient connection in position to exert a force to move the second valve to re-establish said pressure connection, thus increasing said predetermined pressure.

9. In a railway brake mechanism having an air reservoir and brake cylinder on a car, a valve, electro-magnetically operated means for operating the valve, a second valve, means in the first valve for connecting the brake cylinder with the atmosphere, openings in each of the valves and in position, when properly set, to make a connection from the reservoir to the brake cylinder, a pneumatically operated spring pressed piston pneumatically connected to the brake cylinder for moving the second valve out of registration to close the pressure connection from the reservoir to the brake cylinder when the air in the brake cylinder reaches a predetermined pressure an operator-controlled electro-magnetic power device including a resilient connection in position to exert a force to move the second valve to re-establish said pressure connection, thus increasing said predetermined pressure.

10. In a railway brake mechanism having an air reservoir and brake cylinder on a car, a valve, electro-magnetically operated means for operating the valve, a second valve, means in the first valve for connecting the brake cylinder with the atmosphere, openings in each of the valves and in position, when properly set, to make a connection from the reservoir to the brake cylinder, a pneumatically operated piston for moving the second valve out of registration to close the pressure connection from the reservoir to the brake cylinder when the air in the brake cylinder reaches a predetermined pressure and spring-opposed electro-pneumatically operated means for opening the second valve to increase the pressure in the brake cylinder.

11. In a railway brake mechanism having an air reservoir and brake cylinder on a car, a valve, electro-magnetically operated means for operating the valve, a second valve, means in the first valve for connecting the brake cylinder with the atmosphere, openings in each of the valves and in position, when properly set, to make a connection from the reservoir to the brake cylinder, a pneumatically operated piston for moving the second valve out of registration to close the pressure connection from the reservoir to the brake cylinder when the air in the brake cylinder reaches a predetermined pressure, and an electro-magnetically controlled means for opening the second valve to increase the pressure.

12. In a railway brake mechanism having an air reservoir and brake cylinder on a car, a valve, electro-magnetically operated means for operating the valve, a second valve, means in the first valve for connecting the brake cylinder with the atmosphere, openings in each of the valves and in position, when properly set, to make a connection from the reservoir to the brake cylinder, a pneumatically operated piston for moving the second valve out of registration to close the pressure connection from the reservoir to the brake cylinder when the air in the brake cylinder reaches a predetermined pressure, an electro-magnetically controlled means for opening the second valve to increase the pressure, the last named electro-magnetically controlled means including a resilient connection to the second valve.

13. In a railway brake mechanism having an air reservoir and brake cylinder on a car, a valve, electro-magnetically operated means for operating the valve, a second valve, means in the first valve for connecting the brake cylinder with the atmosphere, openings in each of the valves and in position, when properly set, to make a connection from the reservoir to the brake cylinder, a pneumatically operated piston for moving the second valve, a resilient means tending to oppose the movement of the piston when acted upon pneumatically and electro-magnetically controlled means, including a resilient member for moving the second valve to open position to increase the brake cylinder pressure.

14. In a railway brake mechanism having an air reservoir and brake cylinder on a car, a valve chamber and a valve therein, an electro-magnet, an armature connected to the valve and in position to be attracted by the magnet, a spring opposing the electro-magnetic action on the armature, an atmospheric passage, an air passage from the reservoir to the valve chamber, and a passage from the chamber to the brake cylinder, the valve having a space for and in position to provide a connection between the brake cylinder and atmospheric passages when the valve is in one position and an opening in the valve for registration with the brake cylinder when in another position, a second valve and a pneumatic piston having a cylinder space connected with the brake cylinder passage, the second valve having an opening for registration with the opening in the first valve when the latter is connected to the brake cylinder passage.

15. In a railway brake mechanism having an air reservoir and brake cylinder on a car, a valve chamber and a valve therein, an electro-magnet, an armature connected to the valve and in position to be attracted by the magnet, a spring opposing the electro-magnetic action on the armature, an atmospheric passage, an air passage from the reservoir to the valve chamber, and a passage from the chamber to the brake cylinder, the valve having a space for and in position to provide a connection between the brake cylinder and atmospheric passages when the valve is in one position and an opening in the valve for registration with the brake cylinder when in another position, a second valve, a pneumatic piston having a cylinder space connected with the brake cylinder passage, the second valve having an opening for registration with the opening in the first valve when the latter is connected to the brake cylinder passage and electro-magnetic means for opposing pneumatic action of the piston.

16. In a railway brake mechanism having an air reservoir and brake cylinder on a car, a valve chamber and a valve therein, an electro-magnet, an armature connected to the valve and in position to be attracted by the magnet, a spring opposing the electro-magnetic action on the armature, an atmospheric passage, an air passage from the reservoir to the valve chamber, and a passage from the chamber to the brake cylinder, the valve having a space for and in position to provide a connection between the brake cylinder and atmospheric passages when the valve is in one position and an opening in the valve for registration with the brake cylinder when in another position, a second valve, a pneumatic piston having a cylinder space connected with the brake cylinder passage, the second valve having an opening for registration with the opening in the first valve when the latter is connected to the brake cylinder passage, an electro-magnetic means, an armature in position to be operated thereby and resilient means between the pneumatic and the armature.

17. In a railway brake mechanism having an air reservoir and brake cylinder on a car, a valve chamber and a valve therein, an electro-magnet, an armature connected to the valve and in position to be attracted by the magnet, a spring opposing the electro-magnetic action on the armature, an atmospheric passage, an air passage from the reservoir to the valve chamber, and a passage from the chamber to the brake cylinder, the valve having a space for and in position to provide a connection between the brake cylinder and atmospheric passages when the valve is in one position and an opening in the valve for registration with the brake cylinder when in another position, a second valve, a pneumatic piston having a cylinder space connected with the brake cylinder passage, the second valve having an opening for registration with the opening in the first valve when the latter is connected to the brake cylinder passage, a resilient member tending to oppose the movement of the pneumatic piston, an electro-magnetic means, an armature in position to be operated thereby and a resilient means between the pneumatic and the armature.

18. In combination, a pneumatic brake mechanism comprising a reservoir, a brake cylinder and means for making a brake application at a predetermined relatively low pressure and an application to the brakes at a relatively higher pressure and including a single pneumatic connection between the brake cylinder and reservoir, an electro-magnetically controlled pneumatic valve means in the connection for delivering a relatively low predetermined pressure to the brake cylinder, a second electro-magnetic valve-action modifying means for the valve means for exerting a controlling action thereon and for delivering a pressure to the brake cylinder greater than the predetermined pressure.

19. In combination, a pneumatic brake mechanism comprising a reservoir, a brake cylinder and means for making a brake application at a predetermined relatively low pressure and an application to the brakes at a relatively higher pressure and including a pneumatic connection between the brake cylinder and reservoir, an electro-magnetically controlled pneumatic valve means in the connection for delivering a relatively low predetermined pressure to the brake cylinder, a second electro-magnetic valve-action modifying means for the valve means for exerting a modifying action thereon and for delivering a pressure to the brake cylinder greater than the predetermined pressure, the valve means and action modifying means coacting with and in contact with each other to produce a brake pressure at any point between the predetermined pressure and the greater pressure.

20. In a railway brake mechanism, having an air reservoir and a brake cylinder on a car, a valve, a second valve, pneumatically controlled means for operating the second valve to coact with the first valve to place the brake cylinder under predetermined air pressure less than the pressure of the air reservoir, an electro-magnetically controlled means for operating the first valve and a second electro-magnetic means for operating on the pneumatic means to increase the pressure in the brake cylinder above the predetermined pressure.

21. In a multiple-unit train brake system having an air pressure line extending to a plurality of units of the train and an air pressure reservoir and brake cylinder means on each unit connected to the pressure line, an electrical multiple-control means on one of the train units, an electro-magnetic means, a pneumatic means, valve means interdependently controlled by the electro-magnetic means and pneumatic means to establish a predetermined pressure connection between the reservoir and brake cylinder, independently of the air pressure line, and a second electro-magnetic means coacting with the pneumatic means for increasing the pressure in the brake cylinder when both electro-magnetic means are in simultaneous operation.

22. In a railway brake mechanism having an air reservoir and a brake cylinder on a car, an air pressure passage from the reservoir to the brake cylinder, a valve and a coacting port in the passage in position to cut off or admit flow of air under pressure through the passage, electro-magnetically operated means for operating the valve to a fluid supply position, a second valve and a coacting port in the passage for controlling the passage of air to the brake cylinder when the first named valve is in fluid supply position, pneumatic means for operating the second valve under influence of the brake cylinder pressure to move the second valve to a closed-port position when the brake cylinder attains a predetermined pressure, and operator-controlled electro-magnetic power means independent of the first valve and in position to move the second valve to, at will, re-establish said connection, thus increasing said predetermined pressure.

FRANK S. SWICKARD.

REFERENCES CITED

The following references are of record in the file of this patent:

UNITED STATES PATENTS

| Number | Name | Date |
|---|---|---|
| 902,184 | Turner | Oct. 27, 1908 |
| 937,393 | Turner et al. | Oct. 19, 1909 |
| 1,297,514 | Turner | Mar. 18, 1919 |
| 1,490,145 | Thompson | Apr. 15, 1924 |
| 1,653,131 | Thomas | Dec. 20, 1927 |
| 1,742,415 | Rowley | Jan. 7, 1930 |
| 2,014,885 | Farmer | Sept. 17, 1935 |
| 2,017,689 | Down | Oct. 15, 1935 |
| 2,039,733 | McCune | May 5, 1936 |
| 2,121,369 | Morin et al. | June 21, 1938 |
| 2,259,184 | Stehlin | Oct. 14, 1941 |